United States Patent [19]
Chen

[11] Patent Number: 5,222,751
[45] Date of Patent: Jun. 29, 1993

[54] FOLDABLE BICYCLE FRAME

[76] Inventor: Robert W. P. Chen, No. 5, Hwang Pou Village, Fuhsing Hsiang, Chang Hua, Taiwan

[21] Appl. No.: 643,512

[22] Filed: Jan. 22, 1991

[51] Int. Cl.⁵ .............................................. B62K 15/00
[52] U.S. Cl. .................................. 280/278; 280/287; 403/110
[58] Field of Search ...................... 280/287, 278, 281.1, 280/288.3, 279, 280; 403/104, 110, 374, 377; 74/493

[56] References Cited

U.S. PATENT DOCUMENTS

| | | | |
|---|---|---|---|
| 1,096,504 | 5/1914 | Grossman | 280/287 |
| 3,304,099 | 2/1967 | Jankowski | 280/287 |
| 4,443,023 | 4/1984 | Ishibashi | 280/287 |
| 4,579,360 | 4/1986 | Nishimura et al. | 280/287 |
| 4,900,047 | 2/1990 | Montague | 280/287 |

FOREIGN PATENT DOCUMENTS

| | | | |
|---|---|---|---|
| 0260391 | 5/1965 | Australia | 403/110 |
| 0077109 | 2/1954 | Denmark | 403/110 |
| 0361611 | 9/1906 | France | 403/110 |

*Primary Examiner*—Margaret A. Focarino
*Assistant Examiner*—Anne Marie Boehler
*Attorney, Agent, or Firm*—Cushman, Darby & Cushman

[57] ABSTRACT

A foldable bicycle frame comprises a front triangular portion and a rear triangular portion. The former includes a top tube, a down tube, a head tube and a seat tube while the latter contains a bottom bracket tube, a seat stay, a chain stay and a seat tube. Both front and rear triangular portions are hinged by means of upper and lower coupling pieces so that they can pivot to be folded. Upon being unfolded, both front and rear triangular portions are held securely by virtue of a seat stay which extends beyond the seat tube to be fastened securely to the top tube. Front and rear triangular portions can be also held so securely in another manner that a seat post is inserted into connection tube and seat tube which are coaxially arranged.

3 Claims, 4 Drawing Sheets

FOLDABLE BICYCLE FRAME

BACKGROUND OF THE INVENTION

The present invention relates to a bicycle, and more particularly to a bicycle designed with a foldable frame.

The bicycle frame that is most commonly used comprises a front triangular portion and a rear triangular portion. The front triangular portion includes a top tube, a head tube, and a down tube, while the rear triangular portion includes components such as a seat stay, a chain stay, and a seat tube. It is well known that the triangular frames give an added strength in construction to a bicycle to ensure that the safety of a rider is adequately provided.

The foldable bicycle of the conventional type available in the market place today is not made with a body frame of the triangular type. As a result, its structural strength is compromised to a great extent. In addition, the manufacturing process of a foldable bicycle of the conventional type involves some extra jobs, which are otherwise not needed in the manufacture of an ordinary bicycle. Furthermore, many specialized parts are used indispensably as structural components of a foldable bicycle of the conventional type.

SUMMARY OF THE INVENTION

The primary objective of the invention is to provide a foldable bicycle of structural simplicity with a basic structural framework comprising a front triangular portion and a rear triangular to portion to enhance its structural strength.

It is another objective of the invention to provide a foldable bicycle with mechanical parts that are commonly used in an ordinary bicycle.

In keeping with the principles of the present invention, the primary objectives are accomplished by a foldable bicycle frame, which is characterized in that both upper and lower ends of the seat tube are disposed with upper coupling piece and lower coupling piece respectively, and that the rear ends of both top tube and down tube of front triangular portion are welded respectively to upper coupling piece and lower coupling piece so as to permit both front and rear triangular portions to fold together.

The foldable bicycle frame of the present invention is further characterized in that the seat stay of rear triangular portion extends beyond the seat tube into front triangular portion, wherein it is rotatably coupled to top tube. Furthermore, the rear end of down tube is rotatably coupled to the lower coupling piece so as to permit both front and rear triangular portions to fold together.

DETAILED DESCRIPTION OF THE PREFERRED EMBODIMENT

Figure 1:
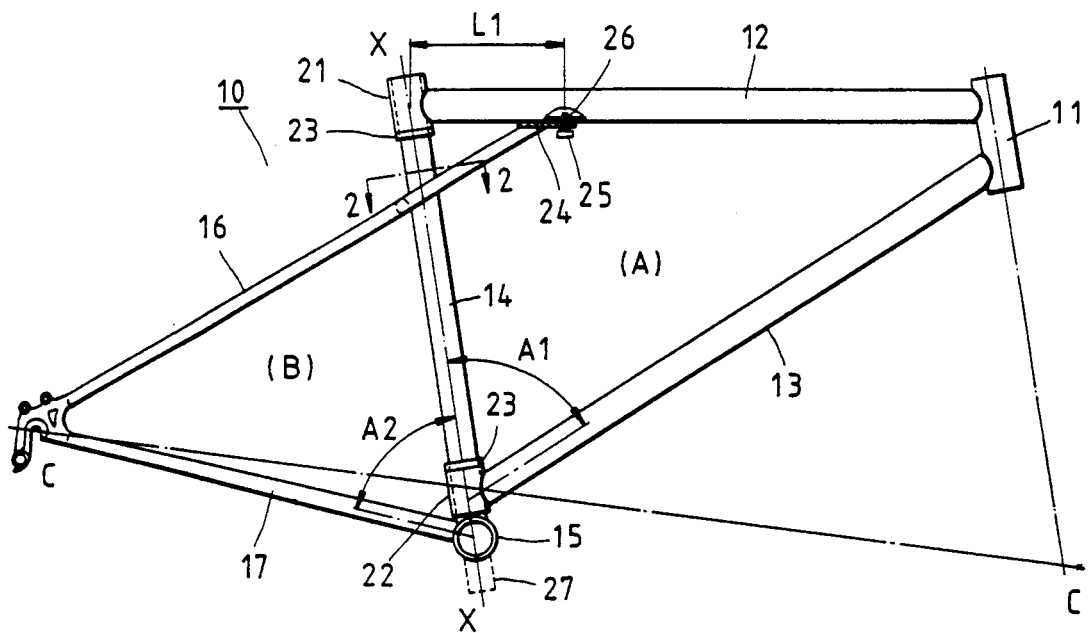
FIG. 1 shows a schematic plane view of a foldable bicycle frame of the first embodiment of the invention.
Figure 2:
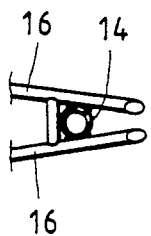
FIG. 2 shows a cut-away view of the portion taken from the line 2—2 shown in FIG. 1.

Referring to FIGS. 1 and 2, the basic framework of a bicycle frame 10 embodied in this invention is shown comprising mainly a front triangular portion (A) and a rear triangular portion (B). The former includes a head tube 11, a top tube 12, and a down tube 13 while the latter comprises a bottom bracket tube 15, a seat stay 16, and a chain stay 17.

Both ends of the seat tube 14 of the foldable bicycle frame 10 according to this invention are encased respectively in the coupling pieces 21 and 22, which are circular tubes having diameters slightly greater than that of the seat tube 14 and are rotatably coupled to the seat tube 14. The rear end of the top tube 12 is welded to the upper coupling piece 21 while the rear end of the down tube 13 is welded to the lower coupling piece 22. The prevention of coupling pieces 21 and 22 from sliding is accomplished by means of a stopper 23 which is fastened securely to the seat tube 14. Each of the two seat stays 16 is welded to the lateral side of the seat tube 14. The front end of the seat stay 16 is welded to a position slab 24, which is fastened to the top tube 12 by means of a through bolt 25 attached to the position slab 24 and a bolt hole 26 disposed in the top tube 12.

Figure 3:
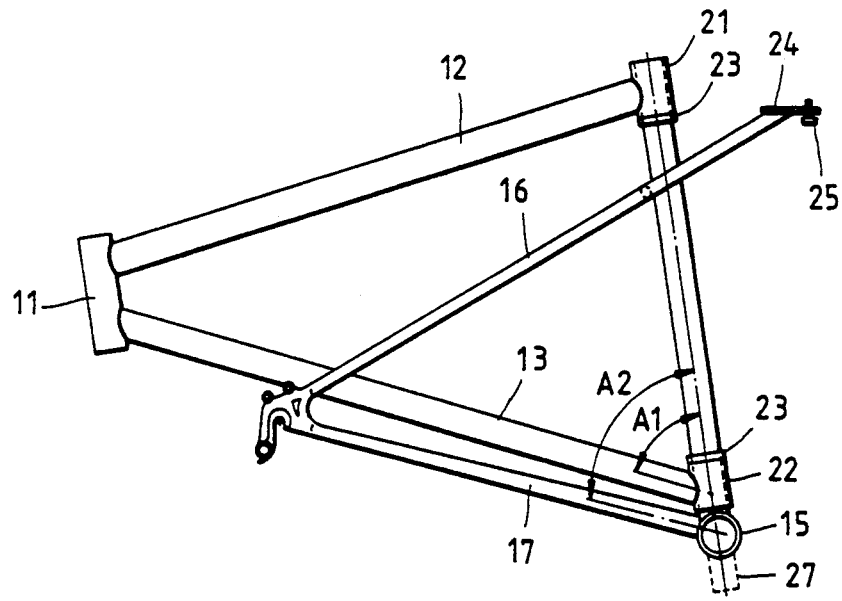
FIG. 3 shows a schematic plane view of the bicycle frame in a folding state, as shown in FIG. 1.

As shown in FIG. 3, the front triangular portion (A) and the rear triangular portion (B) are hinged together by means of two coupling pieces 21 and 22, which encase the seat tube 14. Therefore, both front and rear triangular portions (A) and (B) are capable of folding together on the basis of the axis X-X of the seat tube 14. In addition, there is an allowance of L1 distance between the through bolt 25 and the coupling piece 21, in conjunction with the position slab 24 being securely fastened to top tube 12. Therefore, when the bicycle frame is unfolded, the holding strength between front and rear portions (A) and (B) will not be adversely weakened. On the other hand, the folding of the bicycle frame can be easily done by loosening the through bolt 25 to allow front and rear portions (A) and (B) to fold on the basis of the axial center X-X of coupling pieces 21 and 22. After folding of the bicycle frame is completed, the front wheel is dismantled and placed by the side of the folded bicycle frame.

In addition, an extension tube 27 (shown by dotted lines) welded to seat tube 14 along the axis X-X is rotatably encased by the lower coupling piece 22, which, as previously mentioned, also couples with the seat tube 14 located over the bottom bracket tube 15. If the angle A1 formed by down tube 13 and the axis X-X is equal to the angle A2 formed by chain stay 17 and the axis X-X, front and rear triangular portions (A) and (B) can be folded symmetrically. Furthermore, the locking of front and rear triangular portions (A) and (B) can be accomplished not only by a position slab 24, which is attached securely to top tube 12 and is welded to seat stay 16, but also by other manner in which appropriate positions of locking can be considered.

Figure 4:
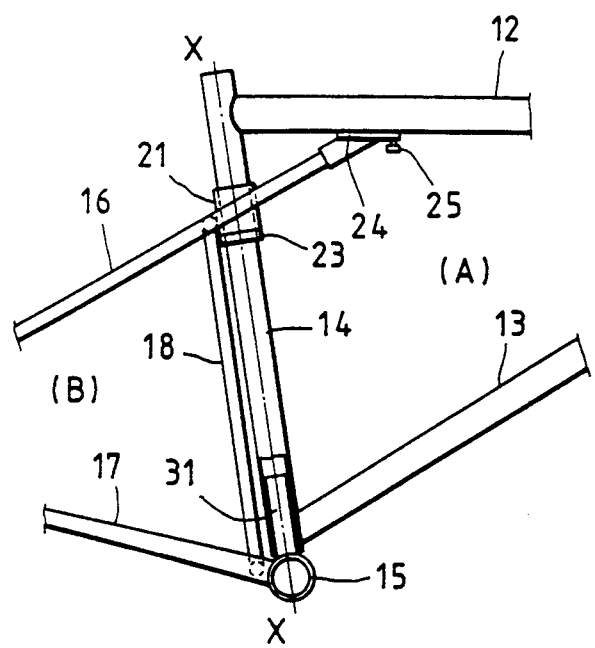
FIG. 4 shows a schematic plane view of a foldable bicycle frame of the second embodiment according to the invention.

Now referring to FIG. 4, the second embodiment of the present invention is shown comprising a top tube 12, a down tube 13, a seat tube 14, a B-B tube 15, a seat stay 16, a chain stay 17, a coupling piece 21, a stopper 23, and a position slab 24. The only differences between the first embodiment and the second embodiment are that the lower coupling piece 31 of the second embodiment is an axial tube enclosed pivotally in the end portion of the seat tube 14, and that there is a supplementary tube 18 welded to seat stay 16 and chain stay 17. The down tube 13 is welded to the end of the seat tube 14. Front and rear triangular portions (A) and (B) of the second embodiment of this invention can pivot to fold on the basis of the axis X-X of the upper coupling piece 21 and the lower gyration piece 31. If necessary, an addition of a fastener to the lower coupling piece 31 is called for in order to give an added strength to the coupling of the lower coupling piece 31 and the seat tube 14 when unfolding of the bicycle frame takes place.

Figure 5:
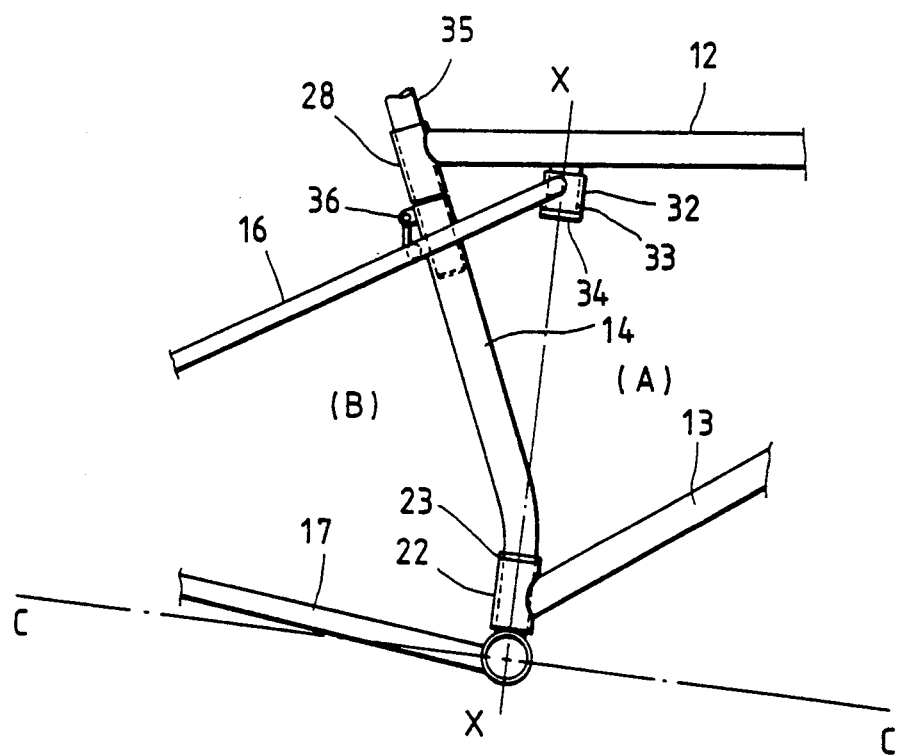
FIG. 5 shows a schematic plane view of a foldable bicycle frame of the third embodiment according to the invention.

As shown in FIG. 5, the foldable bicycle frame of the third embodiment according to this invention comprises top tube 12, down tube 13, seat tube 14, B-B tube 15, seat stay 16, chain stay 17, lower coupling piece 22, and stopper 23. The unique feature of the third embodiment is that the upper coupling piece 32 is pivotally mounted on an axial tube 33 attached to the top tube 12. The bottom end of the axial tube 33, has a stopper 34 disposed thereto for preventing the upper coupling piece 32 from sliding downward. In addition, a connection tube 28, which is arranged at the rear end of top tube 12 and is disposed coaxially at the upper end of the seat tube 14, is installed to accommodate the seat post 35. Furthermore, the front end of seat stay 16 is welded laterally to seat tube 14 while the extended front end of seat stay 16 is welded to the lateral portion of the upper coupling piece 32. The third embodiment of this invention just described above also includes the formation of front and rear triangular portions (A) and (B). It must be stated emphatically that the axis X-X of upper and lower coupling pieces 32 and 22 is perpendicular to the axis C-C of front and rear wheels.

Still referring to FIG. 5, the unfolding of the bicycle frame is accomplished by a seat post 35, which is inserted into the connection tube 28 and the seat tube 14 and is subsequently fastened securely in place by means of a fast dismantling element 36, which is a simple device commonly used in a conventional bicycle. As a result, front and rear triangular portions (A) and (B) have properly unfolded for use by a rider. On the other hand, the folding of the bicycle frame of this embodiment can be easily done by loosening the fast dismantling element 36 to permit the removal of seat post 35 so as to allow both front and rear triangular portions (A) and (B) to pivot along the axis X-X of coupling pieces. Upon completion of folding the bicycle frame, the seat post 35 can be inserted into seat tube 14 again. As a result of axis X-X being perpendicular to axis C-C of front and rear wheels, the positions of both front and rear wheels can be on the same level upon completion of the folding of the bicycle frame.

Figure 6:
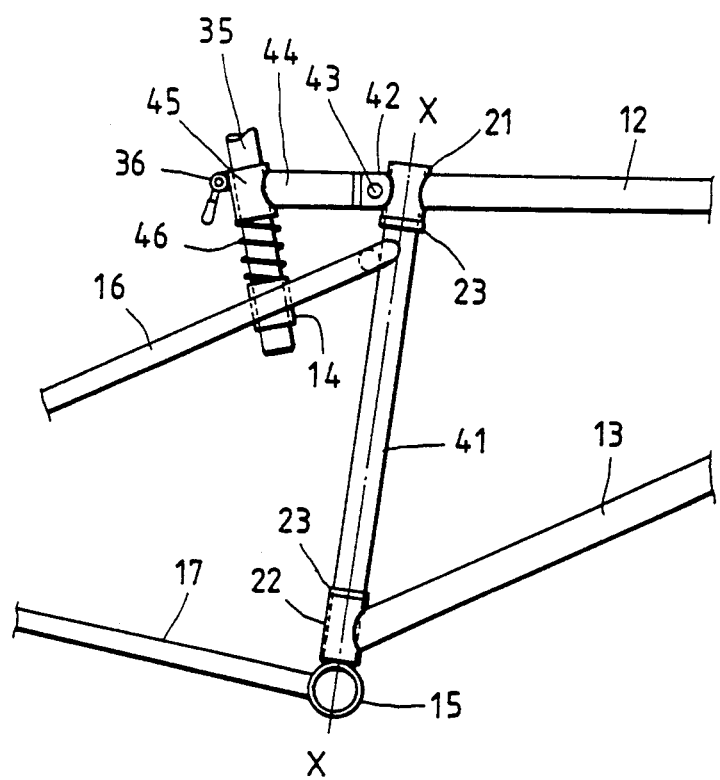
FIG. 6 shows a schematic plane view of a foldable bicycle frame of the fourth embodiment according to the invention.

Now referring to FIG. 6, the fourth embodiment of the present invention is shown comprising top tube 12, down tube 13, seat tube 14, B-B tube 15, seat stay 16, chain stay 17, coupling pieces 21 and 22, and stopper 23. Its characteristics include a seat tube 14 being welded to seat stay 16, and upper and lower coupling pieces 21 and 22 and stopper 23 being arranged on an axial tube 41, whose bottom end is welded to B-B tube 15, whose lateral portions are welded to front end of seat stay 16, and whose top end penetrates into the upper coupling piece 21, which is welded to top tube 12 at the front side thereof and to a tongue 42 at the rear side thereof. The tongue 42 is hinged, by means of an axial pin 43, to the front end of a coupling tube 44, which in turn is welded to a connection tube 45. Located between the connection tube 45 and the seat tube 14 is an elastic element 46, which can be either a coiled spring or a tubular element of elastic nature for use to give an added comfort to the saddle and to mitigate the pressure exerting on seat tube 14. The unfolding of the bicycle frame according to the fourth embodiment of this invention is completed by a seat post 35, which is inserted into the connection tube 45, an elastic element 46 and seat tube 14, and is subsequently locked securely in place by means of a fast dismantiling element 36.

The folding of the bicycle frame of the fourth embodiment can be easily done by loosening the fast dismantling element 36 to permit the removal of seat post 35 so as to allow both front and rear triangular portions (A) and (B) to pivot on the basis of axis X-X of coupling pieces 21 and 22. As a result of the coupling tube 44 being capable of pivoting to the position in front of the axial tube 41, the bicycle frame can be lowered along the axial center of the axial pin 43 in order to reduce the volume of the bicycle body. In the meantime, the seat post 35 remains securely in place inside the elastic element 46 and the seat tube 14. The axis X-X of coupling pieces 21 and 22 according to the fourth embodiment of this invention is also perpendicular to the central line C-C of front and rear wheels. As a result, the positions of front and rear wheels will remain on the same level upon completion of folding of the bicycle frame.

Figure 7:
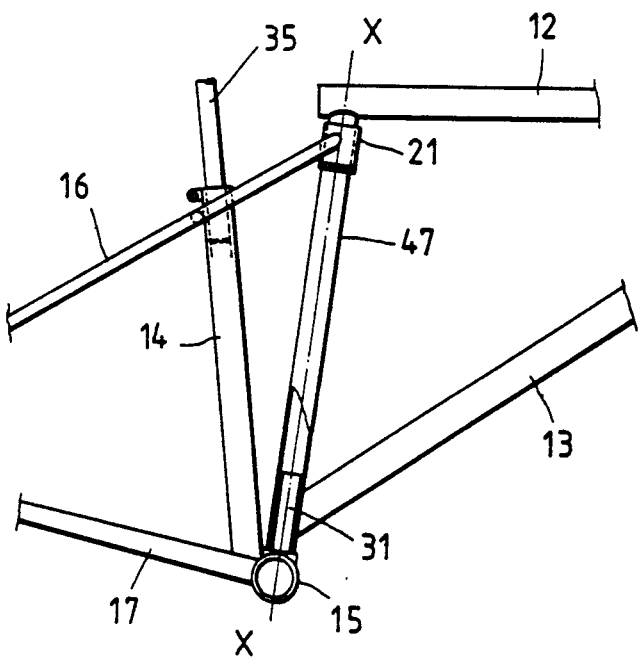
FIG. 7 shows a schematic plane view of a foldable bicycle frame of the fifth embodiment according to the invention.

As shown in FIG. 7, the fifth embodiment of this invention comprises top tube 12, down tube 13, seat tube 14, bottom bracket tube 15, seat stay 16, chain stay 17, upper gyration piece 21, and lower coupling piece 31. The seat stay 16 is welded to both seat tube 14 and upper coupling piece 21. The axis X-X of upper and lower coupling pieces 21 and 31 is also perpendicular to the axial center line C-C of front and rear wheels. The front triangular portion (A) is formed by top tube 12 and down tube 13, which are welded to an axial tube 47 while the rear triangular portion (B) includes seat stay 16, chain stay 17, seat tube 14, and B-B tube 15. The front and rear triangular portions (A) and (B) can pivot to fold symmetrically on the basis of the axis X-X of upper and lower coupling pieces 21 and 31. As is the case respectively in third embodiment and fourth embodiment, a similar connection tube, such as the connection tube 28 used in the third embodiment and a connection tube 45 used in the fourth embodiment, can be employed to accommodate the seat post 35 in the fifth embodiment.

On the basis of the embodiments described above, it is apparent that front and rear triangular portions are capable of pivoting to fold along the axis X-X of upper and lower coupling pieces. The manner in which front and rear wheels are folded depends on the angle of the axis X-X, which is changeable. For example, the axis X-X referred to in this invention can deviate from the plane of top tube 12 and down tube 13 in order to reduce further the volume of the bicycle body upon completion of the folding process.

Figure 8:
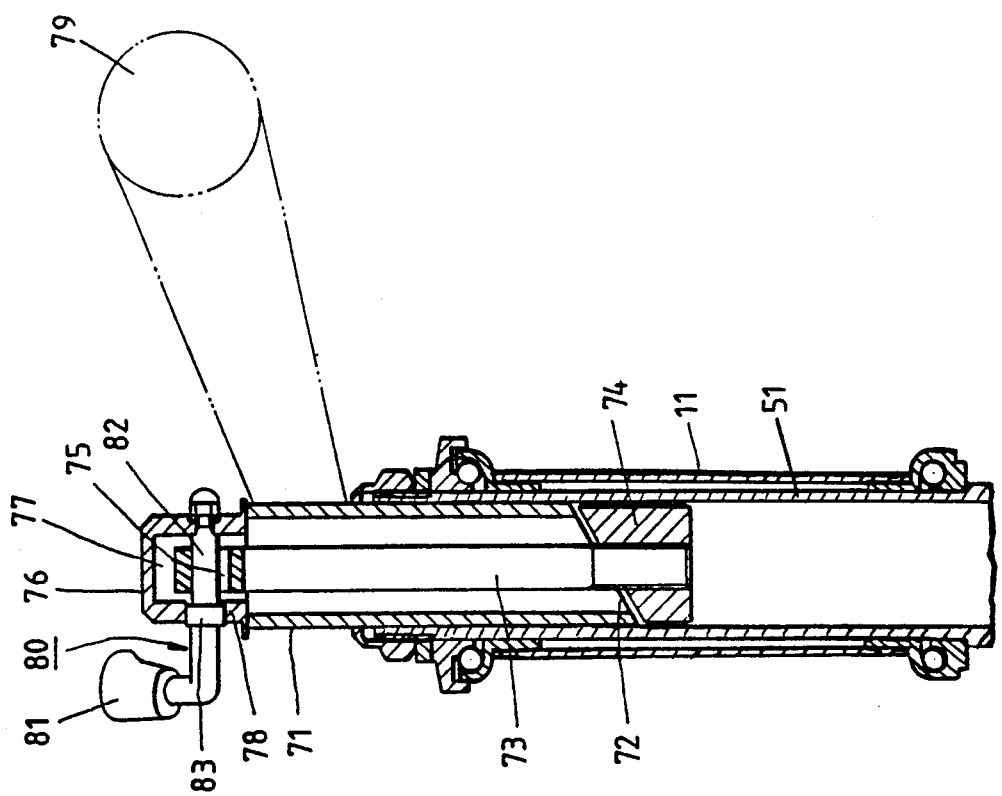
FIG. 8 shows a cut-away view of elements permitting the handle bar and the stem of head tube of a bicycle frame embodied in the invention to be dismantled rapidly.

Upon being folded, front triangular portion (A) and rear triangular portion (B) always appear substantially higher than stem 71 and handle bar 79. For this reason, a fast dismantling device is disposed inside the stem 71 so as to dismantle rapidly both stem 71 and handle bar 79. As shown in FIG. 8, the fast dismantling device comprises a screw rod 73, an inclined wedge block 74, and a handle 80. The fast dismantling device is lodged in a hollow stem 71 which is housed in the fork 51 which in turn is accommodated by head tube 11. The bottom end portion of the fast dismantling device is an inclined wedge plane 72. The screw rod 73, which is arranged inside the stem 71, has an inclined wedge block 74 attached to the bottom end thereof and a circular hole 75 disposed transversely at the top end thereof. Located on the top of stem 71 is a cap 76, which has a vertical hole 77 disposed vertically therein for accommodating the top end portion of the screw rod 73 and has a level hole 78 disposed horizontally therethrough. The diameter of one end of the level hole 78 is greater than that of other end. The crank 80 attached to a knob 81 at one end thereof comprises an eccentric portion 82 and an axis rotating portion 83 which is lodged pivotally in the level hole 78 so as to permit the eccentric portion 82 to be lodged pivotally in the circular hole 75 located at the top end portion of the screw rod 73.

Figure 9:
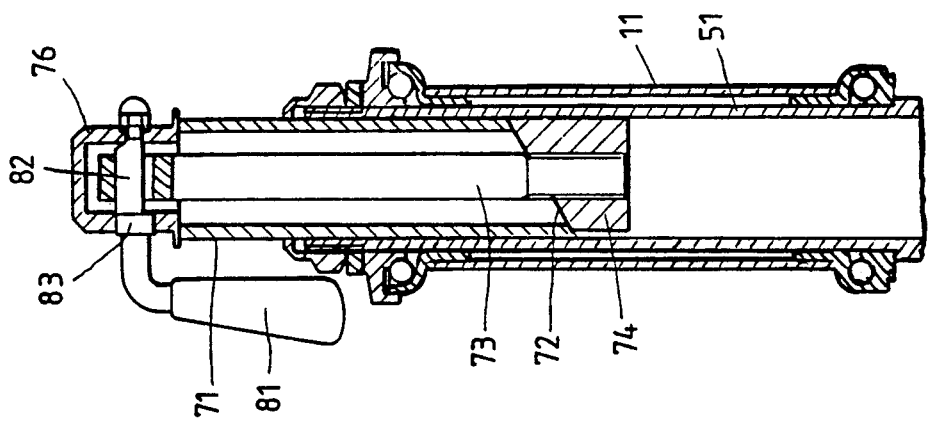
FIG. 9 shows a cut-away view of the fast dismantling elements in a locking state.

When the foldable bicycle is to be in use, the stem 71 and the inclined wedge block 74 must be inserted into the fork 51. The knob 81 is used to activate the eccentric portion 82 to gyrate so as to pull the top end of the screw rod 73 upward. As a result, the inclined wedge block 74 moves upward to be locked together with the stem 71 inside the fork 51, as shown in FIG. 9. The folding of the bicycle frame requires that the crank 80 be loosened so as to activate the eccentric portion 82 to rotate to force the screw rod 73 to move downward. As a result, the inclined wedge block 74 moves downward to be free from being locked inside the fork 51. Therefore both stem 71 and inclined wedge block 74 can be removed from the fork 51 in order to reduce further the volume of the bicycle body.

The embodiment of the present invention described above is to be considered in all respects as merely an illustration of principles of the present invention. Accordingly, the present invention is to be limited only by the scope of the hereinafter appended claims.

What is claimed is:

1. A foldable bicycle frame comprising:
   a front triangular portion having a top tube, a down tube and a head tube;
   a rear triangle portion having a bottom bracket tube, a seat tube, a seat stay and a chain stay;
   an axial tube attached to said top tube having an axial line about perpendicular to a line formed between centers of front and rear wheels of a bicycle;
   an upper coupling piece surrounding the axial tube;
   a lower coupling piece fastened to rear end of said down tube, and arranged coaxially with the upper coupling piece; and
   a connection tube located at upper portion of said seat tube and fastened to said top tube;
   wherein said front triangular portion and said rear triangular portion are pivotally arranged so as to fold about an axial center of said upper coupling piece and said lower coupling piece and are joined together by means of a seat post fitted through said connection tube and said seat tube.

2. A foldable bicycle frame comprising:
   a front triangle portion having a top tube, a down tube, and a head tube;
   a rear triangle portion including a bottom bracket tube, a seat tube, a seat stay, and chain stay;
   a connection tube fastened at rear end of the top tube oriented coaxially with and above the upper end of said seat tube;
   an axial tube fastened at the rear end of the top tube near where said top tube is fastened to said connection tube, said axial tube having a center line substantially perpendicular to a line formed between centers of front and rear wheels of a bicycle;
   an upper coupling piece surrounding said axial tube, a front end of said seat stay being disposed forward of said seat tube and being fastened to said upper coupling piece; and
   a lower coupling piece oriented coaxially with said upper coupling piece and fastened to rear end of the down tube;
   wherein said front triangular portion and said rear triangular portion are pivotally arranged so as to fold about an axial line of said upper coupling piece and said lower coupling piece.

3. A foldable bicycle frame of claim 2 wherein the lower portion of the seat tube is substantially perpendicular to a line formed between centers of front and rear wheels of a bicycle and is surrounded by said lower coupling piece oriented coaxially with said upper coupling piece.

* * * * *